United States Patent [19]

Marincic et al.

[11] 4,293,622

[45] Oct. 6, 1981

[54] STEP CELL

[75] Inventors: Nikola Marincic, Winchester; James Epstein, Sharon, both of Mass.

[73] Assignee: Battery Engineering, Inc., Newton, Mass.

[21] Appl. No.: 124,568

[22] Filed: Feb. 25, 1980

Related U.S. Application Data

[63] Continuation-in-part of Ser. No. 104,157, Dec. 17, 1979, abandoned.

[51] Int. Cl.$^3$ .............................................. H01M 10/44
[52] U.S. Cl. ........................................ 429/50; 429/101; 429/196; 429/199
[58] Field of Search ................... 429/101, 196, 199, 50

[56] References Cited

U.S. PATENT DOCUMENTS

| | | | |
|---|---|---|---|
| 4,012,564 | 3/1977 | Auborn | 429/196 X |
| 4,048,389 | 9/1977 | Bubnick | 429/196 X |
| 4,150,198 | 4/1979 | Domeniconi et al. | 429/196 X |
| 4,167,608 | 9/1979 | Giattino | 429/196 |
| 4,184,007 | 1/1980 | Urry | 429/196 X |
| 4,184,014 | 1/1980 | Dey | 429/196 X |

*Primary Examiner*—Charles F. LeFevour
*Attorney, Agent, or Firm*—Robert A. Seldon

[57] ABSTRACT

A lithium/thionyl chloride electrochemical cell, particularly suitable for use in surgically implanted devices, is disclosed which exhibits a step change in its output voltage sufficiently prior to full cell discharge to enable the timely replacement of the cell under non-critical circumstances.

12 Claims, No Drawings

STEP CELL

This application is a continuation-in-part of our co-pending application, Ser. No. 104,157, filed Dec. 17, 1979 now abandoned.

This invention relates to electrochemical cells and, more particularly, to cells characterized by an operating voltage which is essentially independant of the degree of cell discharge. Such cells are known to employ an electrolyte which includes an oxyhalide depolarizer together with a Lewis acid and Lewis base solute, a a cathode structure formed from a finely ground metallic powder capable of functioning as a catalyst for oxyhalide reduction, and an alkali metal anode.

The oxyhalide depolarizer may, for example, be thionyl chloride, sulfuryl chloride or phosphoroxy chloride. A typical Lewis acid and Lewis base is aluminum chloride and lithium chloride. The cathode structure may comprise carbon, platinum, or palladium. The alkali anode material may illustratively be lithium, calcium, sodium or potassium. Naturally, other materials may be suitable.

Although such cells have greatly simplified the design of most electronic devices by substantially eliminating the need to consider voltage variations during essentially the entire life of the cell, this "flat voltage" characteristic has been a source of concern to designers of certain devices—notably surgically implanted devices such as pacemakers. The reason for concern is, of course, the inability to determine the actual state of cell discharge. The cells are, however, otherwise desirable because, in comparison to to other available cells, they possess an excellent energy density which minimizes cell volume while maximizing cell life. On the other hand, the cells now described are designed for use with cardiac pacemakers and are consequently intended to operate at discharge rates of 120–150 $\mu$A.

Accordingly, there has been a long felt need for a cell having both the energy density and flat voltage characteristic of these aforedescribed cells but which additionally provides an indication of impending cell discharge sufficiently prior to the completion of cell life to afford timely replacement of the cell. The cell could thereby be casually replaced only when necessary, and before the depth of discharge has become critical.

Broadly, the invention herein provides a solution to the forestated problem. It has heretofore been the practice of those skilled in the art to construct the foredescribed cells so that all the electrochemically active materials are exhausted when the cell has reached the end of its specified operating life. Contrary to these teachings, we have deliberately provided an electrolyte-limited cell, i.e. a cell having a ratio of active components which result in the exhaustion of the electrolyte prior to the other active materials. In addition to this ratio of active components, the cell is designed to generally preclude any polarization resulting from too high a discharge rate; accordingly, attention is given to ensure that the cathode structure is not rate-limited below the anticipated discharge rate of the cell.

Further examples and details will be appreciated by reference to the following description of a preferred embodiment of the invention.

In constructing a cell of the type generally described above, an electrochemical system was chosen which employs a lithium anode, a porous carbon cathode, a thionyl chloride depolarizer, and an aluminum chloride/lithium chloride solute.

A sheet of lithium foil weighing 250 mg was inserted into a generally cylindrical and electrically conductive cell housing a pressed into good mechanical and electrical contact along the inner housing wall. The lithium, as is known, becomes cold-welded to the housing wall, yielding a good mechanical bond between the two surfaces. The resulting contact between the foil and housing wall permits the use of the container itself as the anode terminal.

A thin sheet of porous glass separator material is wound into a cylindrical shape, inserted into the container, and pressed against the radially inner face of the lithium foil. The glass separator material is commonly employed in cells to physically isolate the anode and cathode structures and prevent intracell shorting.

A solid cylindrical cathode structure is inserted into the cell so that the glass separator lies interjacent the cathode and anode. The cathode structure comprises 250 mg of carbon having a porosity of 65–90%; that is, 65–90% of the volume is air. The carbon material is impressed on an electrically conductive current collector formed from a material such as nickel, which is compatable with the electrochemical system employed. As is known in the art, current collectors provide low resistance paths from the cell terminal to all regions of the electrode of which they are part. Many current collector configurations are known and generally include a central metallic "feedthrough" which is adapted to pass through a galss-to-metal seal in the top of the container to provide the second terminal of the cell. These features are known in the art and further description is accordingly omitted for the sake of brevity.

The addition of 2.3 grams of electrolyte completes the electrochemical system and results in a cell having a 0.8 A-H capacity. The electrolyte includes thionyl chloride as a cathode depolarizer, and an equimolar ratio of Lewis acid to Lewis base. While the ratio of the Lewis acid and base to thionyl chloride may vary widely, we use, by way of example, 1.8 moles total of lithium chloride and aluminum chloride per liter of electrolyte.

The capacity of the cell 10 is determined by the quantity of active components and is limited by the first component to be exhausted. The objective is to provide a cell in which the thionyl chloride electrolyte is exhausted first. The design of the cell must, therefore, insure that the other cell components are not the source of operating limitations. For example, when the lithium in the cell 10 is exhausted while an excess of active carbon and electrolyte remains, the cell has reached the end of discharge. For the purposes of this description, these cells may be described as anode-limited.

When, on the other hand, the carbon is of insufficient porosity so that its pores are choked with discharge products as the cell is discharged at a constant rate, the electrical resistance associated with the cathode structure increases dramatically. Consequently, the voltage will fall below the operating requirement of the powered apparatus, necessitating the premature replacement of the cell.

The discharge rate of the illustrated cell may also be limited by the contact resistance between the carbon and the nickel current collector. Contact resistance is accordingly minimized by maximizing the surface contact area between the carbon and nickel.

By ensuring that the cells are neither anode-limited nor cathode-limited, the component which is first exhausted is the thionyl chloride electrolyte and such cells with hereinafter be referred to as "electrolyte-limited". Electrolyte-limited cells show a step in output voltage when the cell is designed to avoid polarization from the anode and cathode limitations described above.

Although the relationship between the limited quantity of electrolyte and the resulting "step" in output voltage is not completely understood, it is theorized that a complexing action takes place during cell discharge by which a byproduct of cell discharge combines with the depolarizor to change the thermodynamics of the discharge. As a lithium/thionyl cell is discharged, sulfur dioxide ($SO_2$) is formed. Although it is known that $SO_2$ is soluble in thionyl chloride, the precise nature of the solubility is unclear. We presently believe that the sulfur dioxide complexes with both the aluminim chloride solute of the elctrolyte and the thionyl chloride. The resulting combination of thionyl chloride and sulfur dioxide essentially acts as a new electrolyte which, together with the lithium anode, characterizes an electrochemical system having a different open circuit voltage. Alternatively, it may be that the new species of electrolyte is reduced, with thionyl chloride being extracted at a different voltage. This different voltage is observed as the "step" which characterizes the present cell and occurs at a predetermined time prior to total cell discharge.

The cells, described herein as having a capacity of 0.8A-H, 250 mg of carbon, 250 mg of lithium and 2.3 g of electroyte shows a normal voltage of 3.67 v., and exhibit a step change to 3.35 v at approximately 85% discharge, thereby signaling that total cell discharge is impending.

While the foregoing description has been specific as to the amounts and types of materials employed, it will be recognized that many modifications and variations to the described cell will be apparent to those skilled in the art who have had the benefit of our teachings herein. It is thereby intended that the foregoing description be deemed illustrative in nature and that the invention described herein be defined by the appended claims which, in turn, are to be given the broadest possible scope in view of the prior art.

We claim:

1. An electrochemical cell which exhibits a general step change in output voltage at a predetermined discharge level from a first substantially constant voltage to a second substantially constant voltage, and comprising:
   an alkali metal anode;
   an electrolyte including an oxyhalide cathode depolarizer together with a Lewis acid and a Lewis base and;
   a cathode structure of catalytic material suitable for providing oxyhalide-reducing sites,
   the quantity of electrolyte being proportioned relative to the remaining electrochemically active cell components so as to be the first exhausted.

2. The cell of claim 1 wherein the cathode structure includes a plurality of pores of sufficient size to generally prevent clogging of the pores by discharge products at the intended cell discharge rate.

3. The cell of claim 2 wherein the alkali metal is lithium.

4. The cell of claim 3 wherein the oxyhalide is thionyl chloride.

5. The cell of claim 4 wherein the Lewis base is aluminum chloride.

6. The cell of claim 5 wherein the cell active components are present in the approximate ratio of 250 mg carbon to 250 mg of lithium to 2.3 g of electrolyte.

7. An electrochemical cell which exhibits a generally stepped transition from a first substantially constant voltage to a second substantially constant voltage at a predetermined level of cell discharge and comprising
   an alkali metal anode,
   a first electrolyte including a Lewis acid and a Lewis base together with an oxyhalide cathode depolarizer which complexes with a byproduct of cell discharge; and
   a cathode structure of material capable of providing catalytic sites for the chemical reduction of the oxyhalide,
   the depolarizer being present in such quantity that it is exhausted prior to the alkali metal and being thereafter extracted from the complex at the second voltage level.

8. An electrolyte-limited electrochemical cell which exhibits a generally stepped transition from a first substantially constant voltage to a second substantially constant voltage at a predetermined level of cell discharge and comprising
   a lithium anode;
   an electrolyte including thionyl chloride cathode depolarizer together with a selected one of a Lewis acid and a Lewis base, the volume of electrolyte being proportioned relative to the amount of lithium so that the electrolyte is the first exhausted element; and
   a porous carbon cathode structure, the pores of which are sufficiently large to substantially preclude deterioration of cell performance at the intended cell discharge rate, which deterioration is induced by the clogging of the pores by discharge products.

9. A method for indicating the impending discharge of an electrochemical cell sufficiently prior to full cell discharge to afford timely cell replacement, the cell being of the type normally exhibiting a substantially constant voltage throughout its life and including an alkali metal anode, an electrolyte including an oxyhalide cathode depolarizer together with a Lewis acid and a Lewis base, and a cathode structure of catalytic material suitable to provide oxyhalide-reducing sites, wherein the method comprises the step of limiting the relative amount of electrolyte so that it is the first-exhausted active component.

10. The method of claim 9 including the steps of
   (a) inserting a quantity of lithium into the cell housing,
   (b) inserting a porous carbon cathode structure into the cell housing,
   (c) inserting an electrically insulative and porous seperator between the lithium and carbon, and
   (d) adding a quantity of electrolyte which includes thionyl chloride as a depolarizer.

11. The method of claim 10 including the step of limiting the relative amount of electrolyte to approximately 250 mg. carbon to 250 mg. lithium to 2.3 grams of electrolyte.

12. The method of claim 11 including the step of using an electrolyte containing approximately 1.8 moles of an equimolar ratio of lithium chloride and aluminum chloride per liter of electrolyte.

* * * * *